d Specification Available
7733X
H. KNOWLES.
Whiffletree.
Patented Aug. 29, 1833.
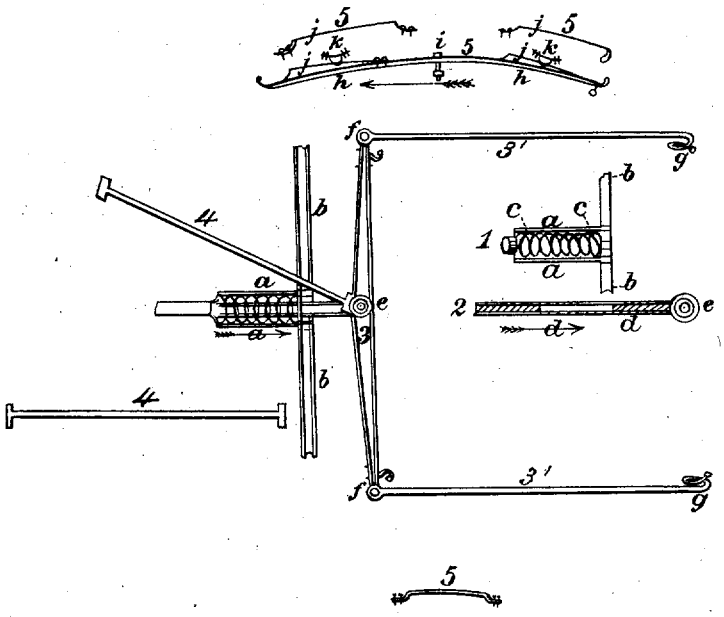
AM. PHOTO-LITHO. CO. N.Y. (OSBORNE'S PROCESS.)

6/27/1833 7733X

Aug. 29 183[illegible] 121.

Hazard Knowles of Colchester Connecticut

Letters Patent

The Schedule referred to in these Letters Patent and making part of the same containing a description in the words of the said Hazard Knowles himself of his improvement in the construction of two wheeled Carriages by which the injurious effects of sudden obstructions on the road are obviated & the ascending and descending of hills facilitated To all whom it may concern. Be it known that I Hazard Knowles of Colchester in the County of New London and State of Connecticut have invented a new and useful mode of applying spiral or other springs to Gigs and other two wheeled Carriages by which the bodies of such carriages are allowed to advance forward when the wheels are suddenly checked by any obstruction in travelling and the unpleasant and injurious effect resulting from the immediate stoppage of the momentum of such Carriage is in a great degree obviated. and the position of the load is so changed in ascending or in descending hills as to be more favorable to the draft of the horse. And I do hereby declare that the following is a full and exact description of my said invention. The spring which I use to prevent the direct arresting of the momentum of the body of the carriage is usually of the spiral kind which I consider as best adapted to the purpose. This spring is contained within a clasp staple or other appendage as shown in No 1. in the accompanying drawing which represents the said spring and its clasp &c. a.a. is a clasp or staple attached to the draw-bar b.b. containing within it the spiral spring c.c. The ends of this spiral spring bear against circular caps with projecting rims to receive them. Through holes in these caps and also in the draw bar, and in the head of the clasp passes the slide No 2. having in it a slot d.d. of a length equivalent to that of the spring c.c. For Gigs of an ordinary size the spring may be from 8 to 9 inches in length and 3 inches in diameter, and a slide of 21 or 22 inches in length will then bear a good proportion to the spring. It may be made round or otherwise about 3/4 of an inch in diameter and the slot about 3/10 of an inch wide

1133X

The part c embraces the whiffletree and is secured to it by a bolt. When the slide pass-
es through the centre of the spring two straps or plates run on the outside of each cap
and having heads on their ends pass thro the slot and resting on the spring thro the
medium of the caps carry the motion of the vehicle in either direction. The whiffletree
No 3. has joints at the ends ff to receive metallic or other rods 3,3. which may be
2 feet 9 inches long. and must be of sufficient strength to hold back as well as draw
the vehicle by the forward ends. These rods are bent at the forward ends g.g. so as
to hold the britching and to hook the tugs. The rods may pass either above or under
the thills and thro loops of leather bolted to the thills. about 4 or 5 inches from
the forward ends of the rods No 4. is a rod of metal or other material extending
from the forked end c. of the slide to the underside of the body. Instead of connecting
the ends of this bar to the body of the vehicle & to the whiffletree by iron eyes I usu-
ally employ a loop of leather strengthened by doubling it, the bolt of the whiffletree
passing thro one of these loops. & another bolt is used to attach the other end to the
body. The load is drawn by means of this rod. Below the ~~the~~ body of the vehicle I place
curved pieces of wood or metal h.h. No 5. which rest upon the thorough braces.
in a gig which I have in use these are three feet 2 inches in length and in form
resemble a cradle spring inverted. they are connected together by a cross bar
fastened at i near their ends are ways of metal jj about 9 inches long resembling
in form the pieces h h and firmly fastened to them. eyes or staples k.k. secured
to the underside of the carriage body enable it to slide backward and forward up-
on the ways jj which they embrace. There are many other methods in which this
sliding part may be constructed. but the foregoing may serve as an exemplification
of its mode or principle of action. From the sliding motion of the carriage the play
of the tug strap may not always be sufficient to render the traversing perfectly free
to obviate which difficulty I make the tug staple upon the thills longer than usual;
but they need not be lengthened in a degree equal to the required play as the strap itself
will answer the intended purpose to a considerable extent. By the arrangement descri-
bed the horse and rider will not only be relieved from the effects of sudden obstructions
on the road but the bearing of the thills & the position of the body & load of two wheeled
vehicles when ascending or descending hills will be so changed as to be favorable to the
draft of the horse. What I claim as my invention is the manner of placing the ver-
tical spring or springs so combined with the sliding motion of the body of a two wheeled

1733X

[illegible] as to produce the effects described, whether the separate parts be considered exactly in the manner therein set forth or in any other operating upon the same principle and producing the same effects Cont.

Witnesses
Thos. Jones
S. Badger.

Hazard Knowles.

(Or in portfolio)

1005 words